United States Patent [19]

Boyle et al.

[11] 4,208,543

[45] Jun. 17, 1980

[54] INSULATING SUPPORT MEANS MOUNTING BUS CONDUCTORS THROUGH AN OPENING IN A GROUNDED METAL WALL

[75] Inventors: Malachy V. Boyle, Narberth; Edward J. Dugan, Norwood, both of Pa.

[73] Assignee: General Electric Company, Philadelphia, Pa.

[21] Appl. No.: 897,089

[22] Filed: Apr. 17, 1978

[51] Int. Cl.$^2$ ............................................ H01B 17/26
[52] U.S. Cl. .............................. 174/152 R; 174/149 B
[58] Field of Search ........... 174/149 B, 152 R, 152 G, 174/153 R, 154, 167, 171

[56] References Cited

U.S. PATENT DOCUMENTS

| | | | |
|---|---|---|---|
| 715,875 | 12/1902 | Rupley | 174/152 R X |
| 1,977,957 | 10/1934 | Stevens | 174/152 G X |
| 1,978,649 | 10/1934 | Roberts | 174/152 G X |
| 2,006,931 | 7/1935 | Powers | 174/152 G X |
| 2,275,203 | 3/1942 | Rudd | 174/167 X |
| 2,823,251 | 2/1958 | Clark | 174/153 R |
| 2,936,331 | 5/1960 | Sillers | 174/171 X |
| 2,958,844 | 11/1960 | Smith et al. | 174/152 R X |
| 3,242,446 | 3/1966 | Leute | 174/152 R X |

FOREIGN PATENT DOCUMENTS

| | | | |
|---|---|---|---|
| 488796 | 1/1930 | Fed. Rep. of Germany | 174/152 G |
| 550688 | 4/1977 | U.S.S.R. | 174/152 R |

OTHER PUBLICATIONS

Papst, H. W., "Stresses in Buses During Short–Circuit", *The Electric Journal*, vol. 31, No. 8, Aug. 1934, pp. 322–323.

*Primary Examiner*—Laramie E. Askin
*Attorney, Agent, or Firm*—William Freedman

[57] ABSTRACT

An insulating support means mounts a bus conductor on a grounded metal wall through which the bus conductor extends. The bus conductor has a thin coating of insulating material bonded to its exterior. The support means comprises a porcelain sleeve mounted on the metal wall and surrounding the bus conductor, with the inner periphery of the sleeve disposed in spaced relationship to the insulating coating. Positioned between the inner periphery of the porcelain sleeve and the insulating coating is a disc of resilient insulating material closely surrounding the bus conductor. This disc has an axial length much shorter than the porcelain sleeve and is thus spaced axially from both ends of the porcelain sleeve.

6 Claims, 2 Drawing Figures

INSULATING SUPPORT MEANS MOUNTING BUS CONDUCTORS THROUGH AN OPENING IN A GROUNDED METAL WALL

BACKGROUND

This invention relates to insulating support means mounting high voltage bus conductors where they pass through openings in a grounded metal wall. The invention is particularly concerned with insulating support means of this type that can withstand without damage the abruptly-varying high forces produced by high short-circuit currents such as 60,000 to 80,000 r.m.s. asymmetrical amperes.

In certain types of electrical equipment that include such insulating support means, it is required that the support means include porcelain as an essential element. This requirement is based, in part, upon recognition of the outstanding dielectric properties of porcelain, particularly its excellent long-term resistance to creep-tracking under adverse environmental conditions. While porcelain has excellent dielectric properties, its ability to withstand the impact forces developed by high short-circuit currents leaves something to be desired, particularly if these forces load the porcelain in tension or bending.

To illustrate this latter point, reference is made to certain tests that we have made with support means that comprises a porcelain sleeve around each bus conductor of a three-phase circuit in the region where the bus conductor passes through a grounded metal wall. In this support means, the porcelain sleeve loosely surrounded its associated bus conductor. When subjected to short-circuit currents, it was found that the porcelain sleeves were fracturing at about 60,000 r.m.s. amperes asymmetrical.

SUMMARY

An object of our invention is to provide insulating support means comprising a porcelain sleeve of the above type that can successfully withstand the forces produced by higher currents than 60,000 r.m.s. amperes asymmetrical without fracture of the porcelain sleeve.

An object is to construct the insulating support means in such a manner that it is able not only to perform as in the preceding object but also to withstand high impulse voltage, e.g., 95 kV, without flashing over.

In carrying out the invention in one form, we provide insulating support means for mounting a bus conductor on a grounded metal wall having an opening through which said bus conductor extends, the bus conductor having a thin coating of insulating material bonded to its exterior. This support means comprises a porcelain sleeve mounted on the metal wall within said opening and surrounding the bus conductor. The inner periphery of the sleeve is disposed in spaced relationship to the insulating coating. Positioned between the insulating coating and the inner periphery of the porcelain sleeve is a disc of resilient insulating material surrounding the bus conductor. This disc has an axial length much shorter than the porcelain sleeve and is thus spaced axially from both ends of the porcelain sleeve.

BRIEF DESCRIPTION OF DRAWINGS

For a better understanding of the invention, reference may be had to the accompanying drawings, wherein.

DETAILED DESCRIPTION OF PREFERRED EMBODIMENT

Figure 1:
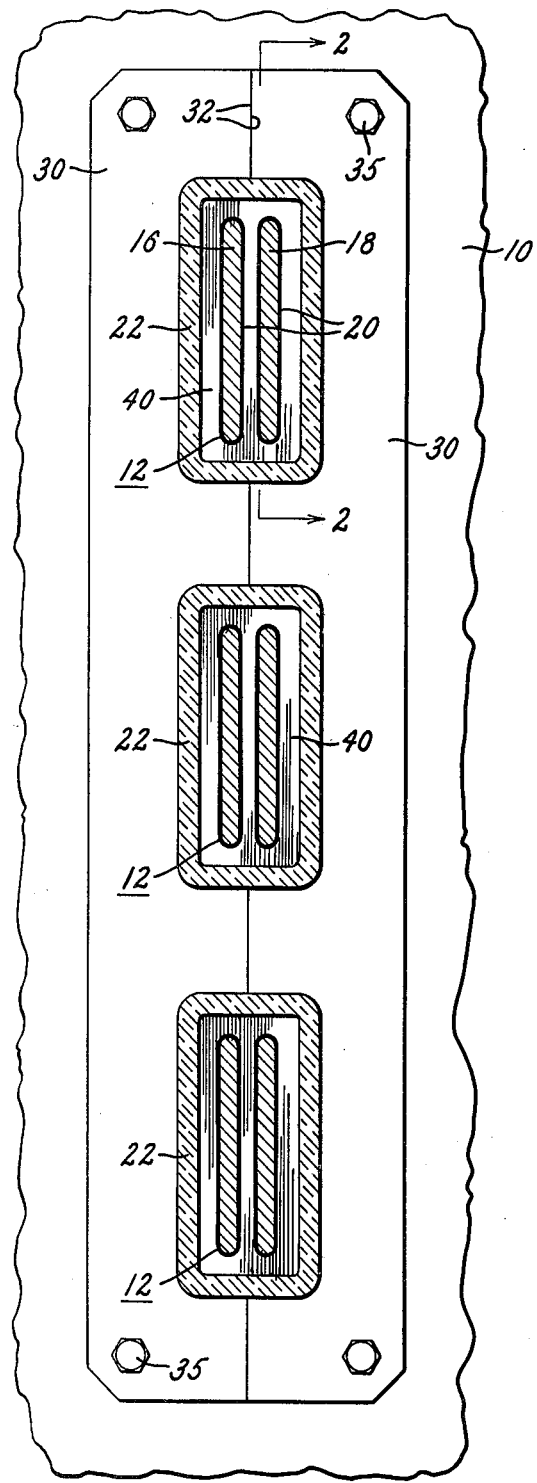
FIG. 1 is a sectional view of insulating support means embodying one form of our invention. This section is taken along a line corresponding to line 1—1 of FIG. 2.
Figure 2:
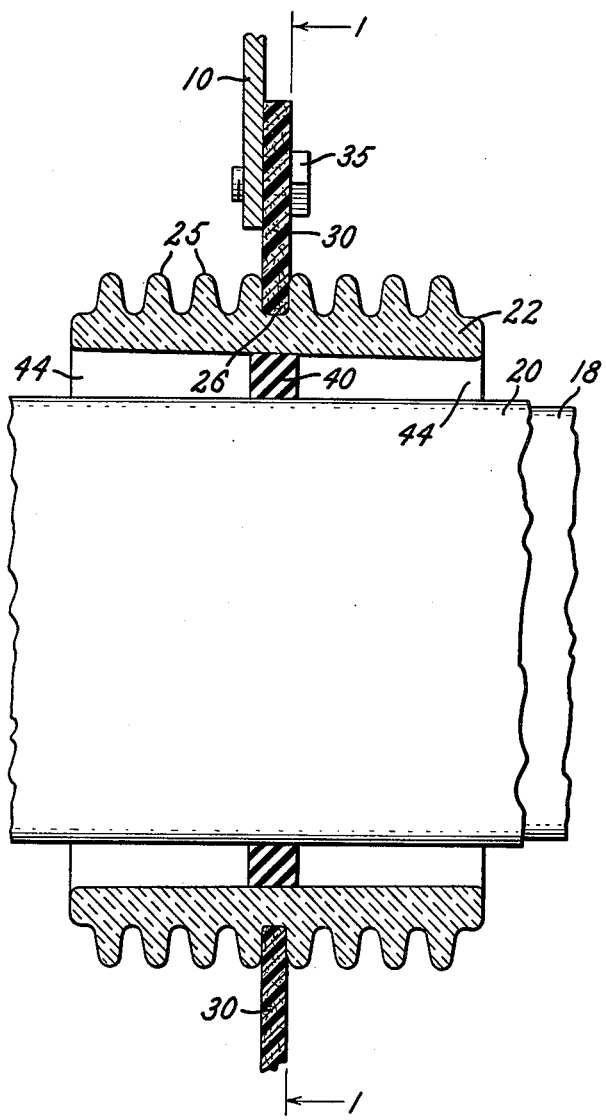
FIG. 2 is a sectional view along the line 2—2 of FIG. 1.

Referring now to FIG. 1, there is shown electrical apparatus comprising a grounded metal wall 10 having an opening therein through which extend the three bus conductors 12 of a three-phase a-c power circuit. In the illustrated embodiment, each bus conductor comprises two closely-spaced bus bars 16 and 18 generally fixed with respect to each other (by suitable clamping means not shown).

Each composite bus conductor 12 has a generally rectangular outer periphery, and each bus bar 16 and 18 also has a general rectangular outer periphery. In a preferred form of the invention, the edges of each bus bar 16 or 18 are located in a vertical plane. Each of the bus bars is surrounded by a thin insulating coating 20 bonded to its external surface. This coating is preferably an epoxy coating applied by a conventional fluidized-bed coating process.

As pointed out hereinabove, it is sometimes required that the support means include porcelain as an essential element in view of porcelain's outstanding dielectric properties. This requirement is met in the illustrated support means by providing around each of the bus conductors 12 a porcelain sleeve 22 that is located within the opening in the metal wall 10. As shown in FIG. 1, each of these porcelain sleeves 22 is of a generally rectangular cross-section. Each has petticoats 25 on its external surface to lengthen the creepage distance therealong, and each has a peripheral notch 26 therein that is used for mounting the sleeve on the metal wall 10, as will soon be described in more detail.

For mounting the porcelain sleeve 22 on the metal wall, a substantially rigid plate 30 of insulating material is provided. This plate is made in two parts disposed in the same plane and meeting along confronting edges 32. Each of these edges 32 is provided with three recesses, and these recesses are disposed in aligned relationship to form openings that receive the porcelain sleeves 22. The portion of the plate 30 around each porcelain sleeve fits within the notch 26 on the outer periphery of the sleeve to fix the sleeve with respect to the plate. The plate 30 is attached to the metal wall by suitable fastening means such as screws 35 at the corners of the plate. Preferably, the plate 30 is of glass-fiber-reinforced polyester material.

The internal bore of each porcelain sleeve 22 has a general rectangular cross-section and surrounds its associated bus conductor 12 in spaced relationship. For supporting the bus conductor on its associated porcelain sleeve, a disc 40 of resilient insulating material is provided. In a preferred form of the invention, this disc is made of ethylene-propylene terpolymer rubber, a material which has good resistance to damage from corona and also high volume and surface resistivities. A preferred rubber of this type showed a volume resistivity greater than $10^{13}$ ohm-cms and a surface resistivity greater than $10^{13}$ ohms. This rubber had a dielectric constant of about 4. Such rubber is available from Elastodyne Corp., Spring Lake, Michigan, as its compound #471.

Each insulating disc 40 contains two side-by-side openings which respectively receive the bus bars 16 and 18 without significant clearance. In a preferred form of the invention, the insulating disc 40 is cemented to the insulating coating on the bus bars by a suitable rubber cement applied along the juxtaposed surfaces of these parts. The outer periphery of disc 40 is of the same shape as the inner periphery of the porcelain sleeve and fits snugly therein. To facilitate obtaining a snug fit between the outer periphery of the disc 40 and the inner periphery of the porcelain sleeve 22, the bore of sleeve 22 is preferably slightly tapered along its length. As a result, when the disc 40 is inserted from the larger end of the bore and moved axially of the bore, it is gradually compressed radially inwardly, thus helping to reduce the size of any gaps or voids within the material of the disc 40 as well as at the interface of the porcelain sleeve 22 and the disc 40.

In assembling this support, we first cement the disc 40 to the coated bus conductor at the proper axial position. Then we insert this composite structure into the porcelain sleeve through the larger end of its bore. The composite structure is moved axially of the porcelain sleeve until the disc 40 lines up with the plate 30. In a preferred form of the invention, the tapered bore of the sleeve 22 is sufficiently small that some radial compression of disc 40 will have occurred by the time plate 30 and disc 40 line up.

Our tests with this insulating support have shown that under normal voltage conditions of 13.8 kV, there is substantially no corona at the outer periphery of the disc 40 even though slight gaps might be present at this region due to an imperfect fit with the surrounding porcelain sleeve. But under impulse conditions, such as the 95 kV impulse conditions typically used for impulse testing of equipment rated 13.8 kV, there is some corona at this interface. We have found, however, that this corona does not lead to a flashover because the region in question is spaced by a substantial distance from the axially-opposed ends of the porcelain sleeve 22. This distance combined with the fact that the large air space 44 at opposite sides of disc 40 is bounded by insulating surfaces (on the exterior of coating 20 and on the bore of porcelain sleeve 22) prevents any corona-initiated discharge from migrating along the conductor length to regions at the ends of the porcelain sleeve 22 where such discharge could initiate a flashover of the entire insulating support.

Another feature of our invention, confirmed by the above described impulse testing at 95 kV, is that the ability of our insulating support to withstand impulse voltages without flashover is dependent upon the rubber of disc 40 having a relatively high resistivity. When rubber having a surface resistivity of about $10^4$ ohms and a volume resistivity of about $10^6$ ohm-cms was used, flashover occurred during the 95 kV impulse test. But when a rubber having a surface resistivity of about $5 \times 10^{10}$ ohms and a volume resistivity of about $4 \times 10^{10}$ ohm-cms was used, the insulating support successfully passed the 95 kV impulse test. It is believed that the lower resistivity rubber assumes a potential during impulse testing and that this increases the field enhancement of associated air gaps within the insulating support, thus triggering flash-overs. In a preferred form of the invention, the material of disc 40 should have a surface resistivity of at least $10^5$ ohms and a volume resistivity of at least $10^7$ ohm-cms.

In short-circuit tests made with this insulating support, it was found that the support was able to withstand without damage the forces produced by short circuits as high as 80,000 amperes r.m.s. asymmetrical. With no resilient disc present between the porcelain sleeve and the bus conductor and a relatively loose fit between these latter two parts, it was found that fractures of the porcelain were occurring at about 60,000 amperes r.m.s. asymmetrical. Thus, substantial increases in ability to successfully withstand mechanical forces have resulted from inclusion of the resilient disc 40.

The resilient disc 40 effectively absorbs a substantial portion of the energy generated by the short-circuit forces, providing a pronounced shock dampening effect that reduces the peak forces developed and transmitted to the porcelain. It should be noted that the resilient disc 40 is not bridged by any rigid structure mechanically in parallel with it that could defeat or interfere with its yielding in response to short-circuit forces, which action enables it to effectively absorb energy generated by such forces, thus reducing force peaks.

To reduce the chances for the porcelain sleeve being loaded in tension or bending as a result of short-circuit-produced forces, it is desirable that the disc 40 be located in substantially the same plane as the plate 30 which supports the porcelain sleeve 22. The major forces developed during short circuits are transversely-directed forces between the bus conductors 12, urging the bus conductors either toward each other or away from each other. If the disc 40 is in line with plate 30, these transversely-directed forces can be transmitted between these parts 30 and 40 primarily by compression in the aligned portion of the porcelain sleeve 22 rather than by tension or bending in the sleeve, which loadings would be present if parts 30 and 40 were not generally aligned. It is generally recognized that porcelain is not nearly as strong in these latter modes as in compression.

While each of the illustrated bus conductors 12 comprises two bus bars, it is to be understood that the invention in its broader aspects is not so limited and is intended to comprehend apparatus in which each bus conductor comprises a single bus bar or even three or more bus bars. Irrespective of the bus conductor configuration, the opening or openings in the disc 40 that receive the coated bus bars should closely surround the coated bus bars, preferably with no significant clearance so as to minimize corona problems in this region.

While we have shown and described particular embodiments of the invention, it will be obvious to those skilled in the art that various changes and modifications may be made without departing from the invention in its broader aspects; and we, therefore, intend herein to cover all such changes and modifications as fall within the true spirit and scope of our invention.

What we claim as new and desire to secure by Letters Patent of the United States is:

1. In combination, an assembly including a bus conductor comprising one or more bus bars each having a thin coating of electrical insulating material closely surrounding its exterior, a grounded metal wall having an opening through which said bus conductor extends, and insulating support means mounting said bus conductor on said grounded metal wall, said insulating support means, bus conductor, and grounded metal wall assembly comprising:

(a) a porcelain sleeve mounted on said metal wall within said opening and surrounding said bus conductor and said thin coating, with the inner periphery of said sleeve disposed in spaced relationship to said insulating coating, (b) a disc of resilient insulating material closely surrounding said bus conductor and positioned between said insulating coating and the inner periphery of said porcelain sleeve, said disc having an axial length much shorter than said porcelain sleeve and being spaced axially from both ends of said sleeve, said resilient disc being yieldable in response to short-circuit forces and having sufficient energy-absorbing capacity during such yielding to materially reduce the peak forces transmitted to said porcelain sleeve under short-circuit conditions, (c) the space between said porcelain sleeve and said insulating coating being free of rigid structure mechanically in parallel with said resilient disc that could interfere with yielding of the disc in response to short-circuit forces and resultant reduction in the peak forces transmitted to the porcelain sleeve, and (d) means mounting said porcelain sleeve on said metal wall comprising a plate of insulating material located externally of said sleeve and disposed in a plane extending generally perpendicular to the longitudinal axis of said sleeve, (e) said plate having an opening receiving said porcelain sleeve and a portion surrounding said opening fitting within a notch in the exterior of said sleeve, and (f) said disc of resilient insulating material being disposed in substantially the same plane as said plate.

2. The combination of claim 1 in which: said porcelain sleeve has an inner periphery that tapers axially of said sleeve, and said disc, during assembly, is forced axially along said sleeve in the direction of said taper sufficiently so that said disc is radially compressed between a tapered portion of said inner periphery of said porcelain sleeve and the coating of said bus conductor.

3. The combination of claim 1 in which:
(a) said bus conductor comprises two spaced-apart bars of generally rectangular cross-section, each of which has an insulating coating thereon, and
(b) said disc of resilient insulating material comprises two spaced-apart openings respectively receiving said bars without significant clearance.

4. The combination of claim 3 in which:
(a) said sleeve has an inner periphery of generally rectangular cross-section, and
(b) said disc has an external periphery of generally rectangular cross-section that fits closely within the inner periphery of said sleeve.

5. The combination of claim 1 in which:
(a) said sleeve has an inner periphery of generally rectangular cross-section, and
(b) said disc has an external periphery of generally rectangular cross-section that fits closely within the inner periphery of said sleeve.

6. The combination of claim 1 in which said resilient disc is of an insulating material that has a surface resistivity of at least $10^5$ ohms and a volume resistivity of at least $10^7$ ohm-centimeters.

* * * * *